US009894461B2

(12) United States Patent
Chen et al.

(10) Patent No.: US 9,894,461 B2
(45) Date of Patent: *Feb. 13, 2018

(54) SERVER FOR SENDING NEW APPLICATION PORTIONS TO MOBILE WIRELESS COMMUNICATIONS DEVICES AND RELATED METHODS

(71) Applicant: BlackBerry Limited, Waterloo (CA)

(72) Inventors: Xianfeng Chen, Mississauga (CA); Orlin Vesselinov Stoev, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/197,400

(22) Filed: Jun. 29, 2016

(65) Prior Publication Data

US 2016/0309280 A1    Oct. 20, 2016

Related U.S. Application Data

(63) Continuation of application No. 14/223,474, filed on Mar. 24, 2014, now Pat. No. 9,386,396, which is a
(Continued)

(51) Int. Cl.
*H04W 4/00*     (2009.01)
*H04L 29/08*    (2006.01)
(Continued)

(52) U.S. Cl.
CPC .............. *H04W 4/001* (2013.01); *G06F 8/65* (2013.01); *H04L 67/34* (2013.01); *H04W 4/20* (2013.01); *H04L 67/26* (2013.01)

(58) Field of Classification Search
CPC .............................. H04W 4/001; H04L 67/34
See application file for complete search history.

(56) References Cited

U.S. PATENT DOCUMENTS

| 7,099,288 B1 * | 8/2006 | Parker ............... H04L 29/12018 348/14.01 |
| 7,257,583 B2 | 8/2007 | Hofmeister et al. |

(Continued)

FOREIGN PATENT DOCUMENTS

| EP | 1083482 | 3/2001 |
| WO | 03054695 | 7/2003 |

OTHER PUBLICATIONS

Extended European Search Report dated Dec. 4, 2009 from EP09167693, 6 pages.
(Continued)

*Primary Examiner* — Joseph Dean, Jr.
(74) *Attorney, Agent, or Firm* — Jenna L. Wilson; Wilson Lue LLP

(57) ABSTRACT

A communications system is to communicate with an application server storing a plurality of applications. The communications system includes a mobile wireless communications device configured to store at least one application from among the plurality of applications, the at least one application having stored version information associated therewith. An intermediate server is configured to update the mobile wireless communications device by at least obtaining respective current version information for associated current versions of the plurality of applications and obtaining the stored application version information from the mobile wireless communications device for the at least one stored application. The stored application version information is compared with the current version information for the at least one stored application. New application portions are downloaded from a current application associated with the current version information, and the new application portions are sent to the mobile wireless communications device.

15 Claims, 7 Drawing Sheets

Related U.S. Application Data continuation of application No. 13/718,480, filed on Dec. 18, 2012, now Pat. No. 8,706,102, which is a continuation of application No. 13/487,995, filed on Jun. 4, 2012, now Pat. No. 8,364,137, which is a continuation of application No. 12/539,744, filed on Aug. 12, 2009, now Pat. No. 8,213,921.

(60) Provisional application No. 61/103,782, filed on Oct. 8, 2008.

(51) Int. Cl.
*H04W 4/20* (2009.01)
*G06F 9/445* (2006.01)

(56) References Cited

U.S. PATENT DOCUMENTS

| | | | |
|---|---|---|---|
| 7,386,846 B2 | 6/2008 | Rajaram | |
| 7,409,208 B1 | 8/2008 | Clare et al. | |
| 7,783,729 B1* | 8/2010 | Macaluso | G06F 8/63 455/414.2 |
| 8,213,921 B2 | 7/2012 | Chen et al. | |
| 2003/0092438 A1 | 5/2003 | Moore et al. | |
| 2004/0002943 A1 | 1/2004 | Merrill et al. | |
| 2004/0068721 A1 | 4/2004 | O'Neill et al. | |
| 2004/0098715 A1 | 5/2004 | Aghera et al. | |
| 2005/0185660 A1 | 8/2005 | Ekberg et al. | |
| 2006/0217111 A1 | 9/2006 | Marolia et al. | |
| 2007/0135111 A1 | 6/2007 | Floyd | |
| 2008/0020737 A1 | 1/2008 | Neil et al. | |
| 2008/0052383 A1 | 2/2008 | O'Shaughnessy et al. | |
| 2008/0072218 A1 | 3/2008 | Kwon | |
| 2008/0195691 A1 | 8/2008 | Kloba et al. | |
| 2008/0209451 A1 | 8/2008 | Michels et al. | |
| 2008/0216066 A1 | 9/2008 | Oh | |
| 2009/0017812 A1 | 1/2009 | Chan et al. | |
| 2009/0215476 A1 | 8/2009 | Tysowski | |
| 2009/0232132 A1 | 9/2009 | Roy | |
| 2010/0169286 A1 | 7/2010 | Hackworth | |
| 2010/0251230 A1 | 9/2010 | O'Farrell et al. | |
| 2011/0289499 A1* | 11/2011 | Haubold | G06F 8/65 717/173 |

OTHER PUBLICATIONS

Examiner's Report dated Jan. 27, 2011 from EP09167693, 7 pages.
Examiner's Report dated Jul. 10, 2012 from CA2675351, 3 pages.

* cited by examiner

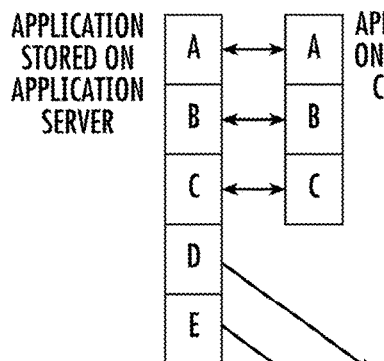 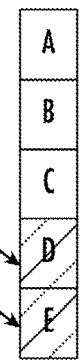
FIG. 2A
FIG. 2B
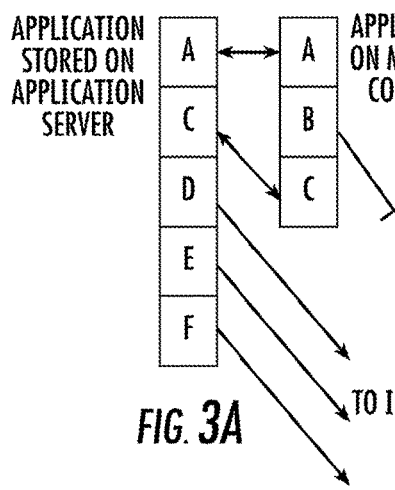 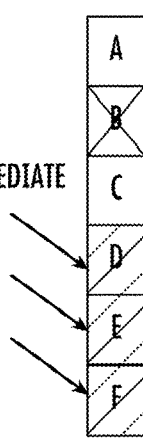
FIG. 3A
FIG. 3B

SERVER FOR SENDING NEW APPLICATION PORTIONS TO MOBILE WIRELESS COMMUNICATIONS DEVICES AND RELATED METHODS

REFERENCE TO PRIOR APPLICATIONS

This application is a continuation of U.S. application Ser. No. 14/223,474, filed Mar. 24, 2014, which is a continuation of U.S. application Ser. No. 13/718,480, filed Dec. 18, 2012 (now U.S. Pat. No. 8,706,102 issued Apr. 22, 2014), which is a continuation of U.S. application Ser. No. 13/487,995, filed Jun. 4, 2012 (now U.S. Pat. No. 8,364,137 issued Jan. 29, 2013), which is a continuation of U.S. application Ser. No. 12/539,744, filed Aug. 12, 2009 (now U.S. Pat. No. 8,213,921 issued Jul. 3, 2012), which claims priority from U.S. Provisional Application No. 61/103,782, filed Oct. 8, 2008, the entireties of which are incorporated herein by reference.

TECHNICAL FIELD

The present disclosure relates to the field of communications systems, and, more particularly, to mobile wireless communications systems and related methods.

BACKGROUND

Cellular communications systems continue to grow in popularity and have become an integral part of both personal and business communications. Cellular telephones allow users to place and receive voice calls most anywhere they travel. Moreover, as cellular telephone technology has increased, so too has the functionality of cellular devices and the different types of devices available to users. For example, many cellular devices now incorporate personal digital assistant (PDA) features such as calendars, address books, task lists, etc. Moreover, such multi-function or "smart" devices may also allow users to wirelessly send and receive electronic mail (email) messages and access the Internet via a cellular network and/or a wireless local area network (WLAN), for example.

Mobile devices such as smart phones are also capable of running relatively sophisticated applications, such as games, document processing applications, chat or instant messaging applications, etc. As a result, it may be desirable to provide enhanced approaches for accessing and managing applications and upgrades thereto for mobile devices, especially as new applications and new versions of existing applications continue to be developed and become available.

BRIEF DESCRIPTION OF THE DRAWINGS

FIG. 2A is a schematic diagram illustrating an application stored on the mobile wireless communications device (of FIG. 1) compared with a current version of that application stored on an application server (of FIG. 1).

FIG. 2B is a schematic diagram illustrating the application stored on the mobile wireless communications device (of FIG. 1) as updated with the new portions shown in FIG. 2A.

FIG. 3A is a schematic diagram illustrating an application stored on the mobile wireless communications device (of FIG. 1) compared with a current version of that application stored on an application server (of FIG. 1).

FIG. 3B is a schematic diagram illustrating the application stored on the mobile wireless communications device (of FIG. 1) as updated with the new portions shown in FIG. 3A.

DETAILED DESCRIPTION

Figure 1:
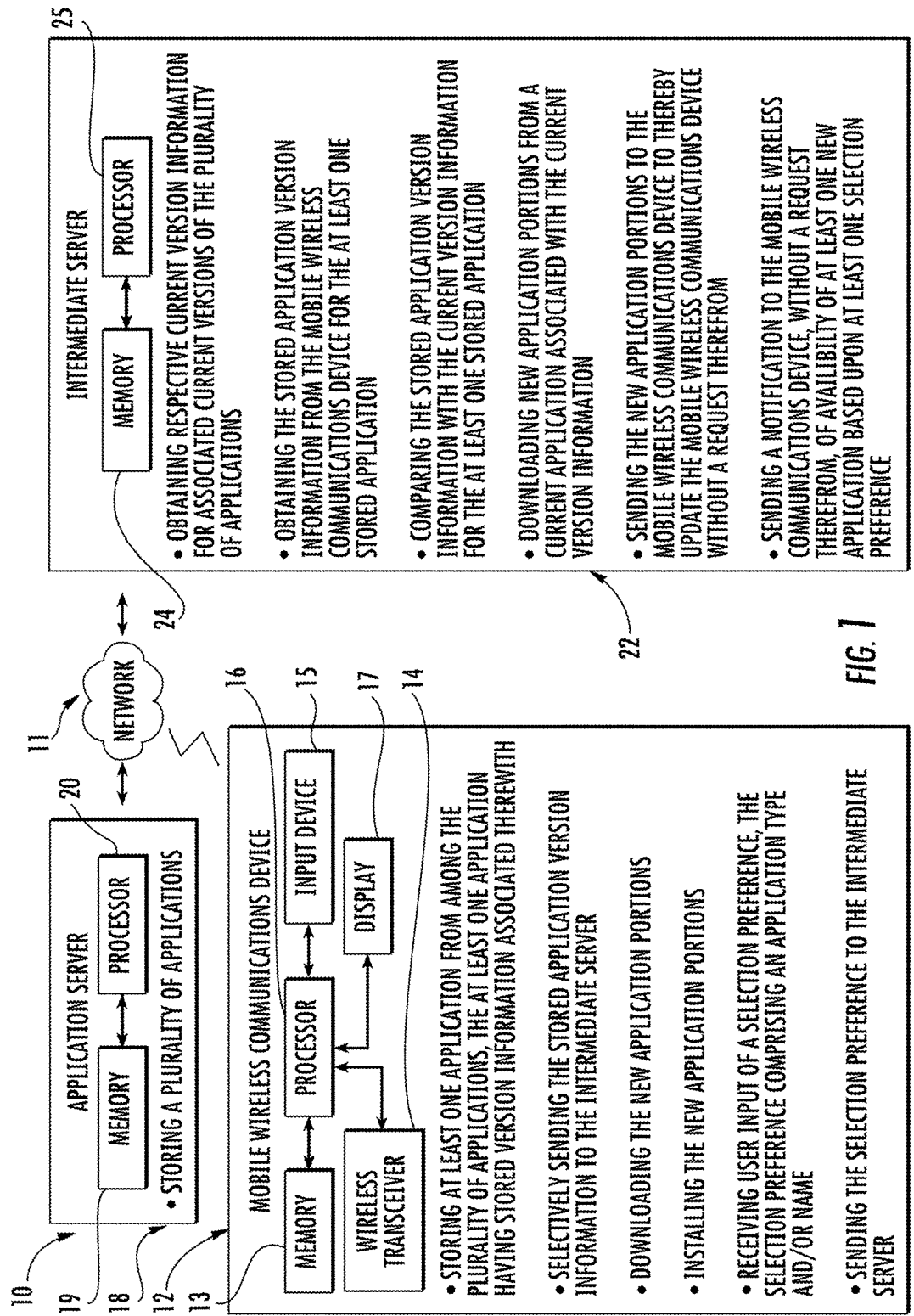
FIG. 1 is a schematic block diagram of a communications system in accordance with the present disclosure.

The present description is made with reference to the accompanying drawings, in which various embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system is to communicate with an application server storing a plurality of applications and may comprise at least one mobile wireless communications device configured to store at least one application from among the plurality of applications. The at least one application may have stored version information associated therewith. An intermediate server may be configured to update the at least one mobile wireless communications device by at least obtaining respective current version information for associated current versions of the plurality of applications, and obtaining the stored application version information from the at least one mobile wireless communications device for the at least one stored application. The intermediate server may also be configured to obtain the respective current version information from the application server.

In addition, the intermediate server may compare the stored application version information with the current version information for the at least one stored application and may download new application portions from a current application associated with the current version information. The new application portions may be sent to the at least one mobile wireless communications device.

Further, the intermediate server may update the at least one mobile wireless device without a request therefrom. The intermediate server may also send a notification to the at least one mobile wireless communications device of availability of at least one new application based upon at least one selection preference. Moreover, the intermediate server may send the notification without a request from the at least one mobile wireless communications device. The at least one selection preference may comprise at least one of an application type and an application name.

Also, the at least one mobile wireless communications device may selectively permit the intermediate server to obtain the stored version information. The at least one mobile wireless communications device may install the new application portions based upon no user input. Alternatively, the at least one mobile wireless communications device may install the new application portions based upon user input. The at least one mobile communications device may comprise a processor and a memory cooperating therewith and the intermediate server may also comprise a processor and a memory cooperating therewith.

Another aspect is directed to a communications system comprising an application server comprising an application module for storing a plurality of applications. The communications system may include at least one mobile wireless communications device configured to store at least one application from among the plurality of applications, the at least one application having stored version information associated therewith. The application server may further comprise an intermediate module configured to update the at least one mobile wireless communications device by at least obtaining respective current version information from the application module for associated current versions of the plurality of applications, and obtaining the stored application version information from the at least one mobile wireless communications device for the at least one stored application. The intermediate module may also compare the stored application version information with the current version information for the at least one stored application and download new application portions from a current application associated with the current version information. Further, the intermediate module may send the new application portions to the at least one mobile wireless communications device.

A method aspect is directed to a method of operating an intermediate server for communicating with an application server storing a plurality of applications for updating a mobile wireless communications device storing at least one application from among the plurality of applications, the at least one application having stored version information associated therewith. The method may include obtaining respective current version information for associated current versions of the plurality of applications. The respective current version information may be obtained from the application server. Furthermore, the stored application version information may be obtained from the at least one mobile wireless communications device for the at least one stored application. The stored application version information may be compared with the current version information for the at least one stored application. New application portions may be downloaded from a current application associated with the current version information. The new application portions may be sent to the at least one mobile wireless communications device.

With reference to FIG. 1, a communications system 10 including a mobile wireless communications device 12 according to the present disclosure is now described. Although the communications system 10 is described with reference to one mobile wireless communications device 12, it should be readily understood that there may be any number of mobile wireless communications devices belonging to the communications system.

The communications system 10 includes an application server 18 which comprises a processor 20 and a memory 19 cooperating therewith for storing a plurality of applications. The plurality of applications may include any applications for the mobile wireless communications device 12, for example games, or map applications.

The mobile wireless communications device 12 comprises a processor 16 coupled to a memory 13, a wireless transceiver 14, an input device 15, and a display 17. The memory may be volatile memory, such as RAM, or non-volatile memory, such as flash RAM or a hard drive. The input device 15 may be a keyboard, a thumbwheel, or a trackball, for example. The input device 15 may also be a microphone or a wireless receiver (e.g. bluetooth), as will be appreciated by those of skill in the art. Of course, the display 17 may be a touch sensitive screen and may therefore also serve as the input device 15. In addition, the mobile wireless communications device 12 may include a portable housing and a rechargeable battery.

The processor 16 cooperates with the memory 13 and the wireless transceiver 14 for communicating with an intermediate server 22 via a wireless network 11, that may typically be provided by a cellular telephone network, but any suitable network (for example, WiFi) may be used. The network may be a Code Division Multiple Access (CDMA) network, a 3G network, or other suitable cellular network. Such a cellular network provides for data transfer communications in addition to voice communications, and provides connectivity with the Internet.

The intermediate server 22 comprises a processor 24 cooperating with a memory 25 and a transceiver 23 for communicating with the application server 18. This communication may be via the Internet. The processor 24, and a memory 25 of the intermediate server 22 are also for obtaining respective current version information for associated current versions of the plurality of applications. That is, the intermediate server 22 learns the versions of the applications stored on the application server 18. The intermediate server 22 may obtain this current version information by polling the application server 22, or the application server may send it to the intermediate server without a request therefrom, for example via a server push. Alternatively or additionally, the current version information may be sent to the intermediate server 22 from an outside source (i.e. an administrator).

The processor 24 and memory 25 of the intermediate server 22 further obtain stored user application version information from the mobile wireless communications device 12. That is, the intermediate server 22 learns the version of at least one application stored on the mobile wireless communications device 12. The intermediate server 22 may obtain the stored user application version from the mobile wireless communications device 12 by polling it, or the mobile wireless communications device may send the stored user application version to the intermediate server without a request therefrom, for example via a server push.

The processor 24 and the memory 25 of the intermediate server 22 cooperate to compare the stored user application version with the current version information for the at least one stored user application. If the comparison shows that the stored user application (on the mobile wireless communications device 12) is an older version than the corresponding application stored on the application server 18, the intermediate server 22 downloads, via the transceiver 33, new application portions from the corresponding application stored on the application server 18. Before the intermediate server 22 downloads the new application portions, it compares the application stored on the mobile wireless communications device 12 with the corresponding application stored on the application server 18.

Referring now to FIG. 2A, this comparison is now explained. The application stored on the mobile wireless communications device 12 has portions A, B, and C. The corresponding application stored on the application server 18 is a newer version of the application and includes portions A, B, C, D, and E. The intermediate server 18 downloads application portions D and E, as they are new application portions not included in the version of the application stored on the mobile wireless communications device 12.

After the intermediate server 18 downloads the new application portions, it sends them, via the transceiver 23, to the mobile wireless communications device 12 (which downloads them via its transceiver 14) to thereby update the mobile wireless communications device. The processor 16 and memory 13 of the mobile wireless communications device 12 cooperate to install the new application portions. As shown in FIG. 2B, new application portions D and E have been added to the application stored on the mobile wireless communications device 12 (D and E are shaded to show they have been added).

Another example of the comparing and updating is now described with reference to FIGS. 3A and 3B. In FIG. 3A, the application stored on the mobile wireless communications device 12 has portions A, B, and C. The corresponding application stored on the application server 18 is a newer version of the application and includes application portions A, C, D, E, and F. Thus, application portions D, E, and F are new, while portion B has been removed. The intermediate server 18 downloads application portions D, E, and F as they are the new application portions not included in the version of the application stored on the mobile wireless communications device 12. Further, the intermediate server 22 records that portion B has been removed from the newer version of the application.

The processor 16 and memory 13 of the mobile wireless communications device 12 cooperate to install the new application portions and to remove the application portions no longer contained in the newer version of the application. As shown in FIG. 3B, the new application portions D, E, and F have been added to the application stored on the mobile wireless communications device 12 (D, E, and F are shaded to show they have been added), while application portion B has been removed (indicated with an X).

Those skilled in the art will appreciate that the processor 16 and memory 13 of the mobile wireless communications device 12 may cooperate to install the new application portions based upon user input (approval from the user to install the new application portions) or based upon no user input. In some instances, the mobile wireless communications device 12 may accept user input of which applications may have new application portions installed therefore without user input, and of which applications may have the new application portions installed based upon user input or approval.

In the embodiment schematically illustrated in FIG. 1, the intermediate server 22 updates the mobile wireless communications device by sending the new application portions to the mobile wireless communications device 12 without a request therefrom, for example using a server push. Of course, in other embodiments, the mobile wireless communications device 12 may instead poll the intermediate server 22 for the new application portions.

In addition, in the illustrated embodiment, the mobile wireless communications device 12 selectively sends the stored application version information to the intermediate server 22. The mobile wireless communications device 12 may accept user selection of which stored application version information about which stored user application may be sent to the intermediate server 22. Therefore, the user may advantageously choose which applications he/she would like the intermediate server 22 to update as a matter of course.

In addition to updating applications already stored in the memory 13 of the mobile wireless communications device 12, the intermediate server 22 may send notification of new applications thereto based upon at least one selection preference. The selection preference may be a user selection of an application type, application name, application developer, features supported by an application (i.e. touch screen input, device orientation sensor input from a mobile wireless communications device so equipped, etc), or other suitable selection preference. For example, a user may wish to be notified of any game releases related to a certain movie, or related to a political election.

Figure 4:
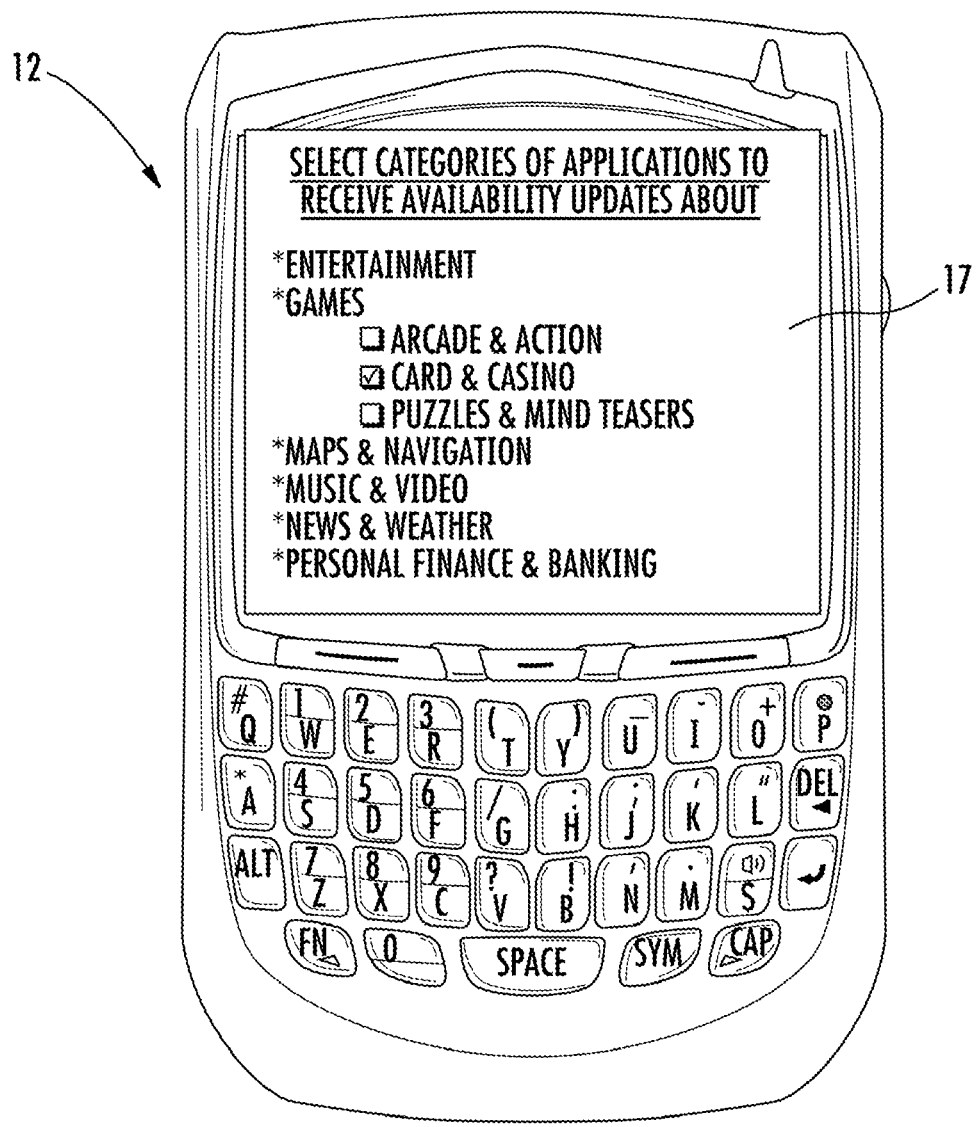
FIG. 4 is a front view of the mobile wireless communications device of FIG. 1 receiving an input of application selection preferences.

This functionality of the mobile wireless communications device 12 is now described with additional reference to FIG. 4. Here, the display 17 of the mobile wireless communications device 12 is displaying a list of application categories to the user. The user has selected that he/she would like to receive notification of the availability of new card & casino games, as indicated by the check mark in the box next to that category. This selection preference has been sent from the mobile wireless communications device 12 to the intermediate server 22.

With further reference to FIG. 1, the intermediate server 22 sends notification of availability of at least one new application to the mobile wireless communications device 12 based upon the at least one selection preference, without a request therefrom. For example, this notification may be sent via a server push, but in other embodiments, the mobile wireless communications device 12 may instead query the intermediate server 22 for availability of the at least one new application.

Figure 5:
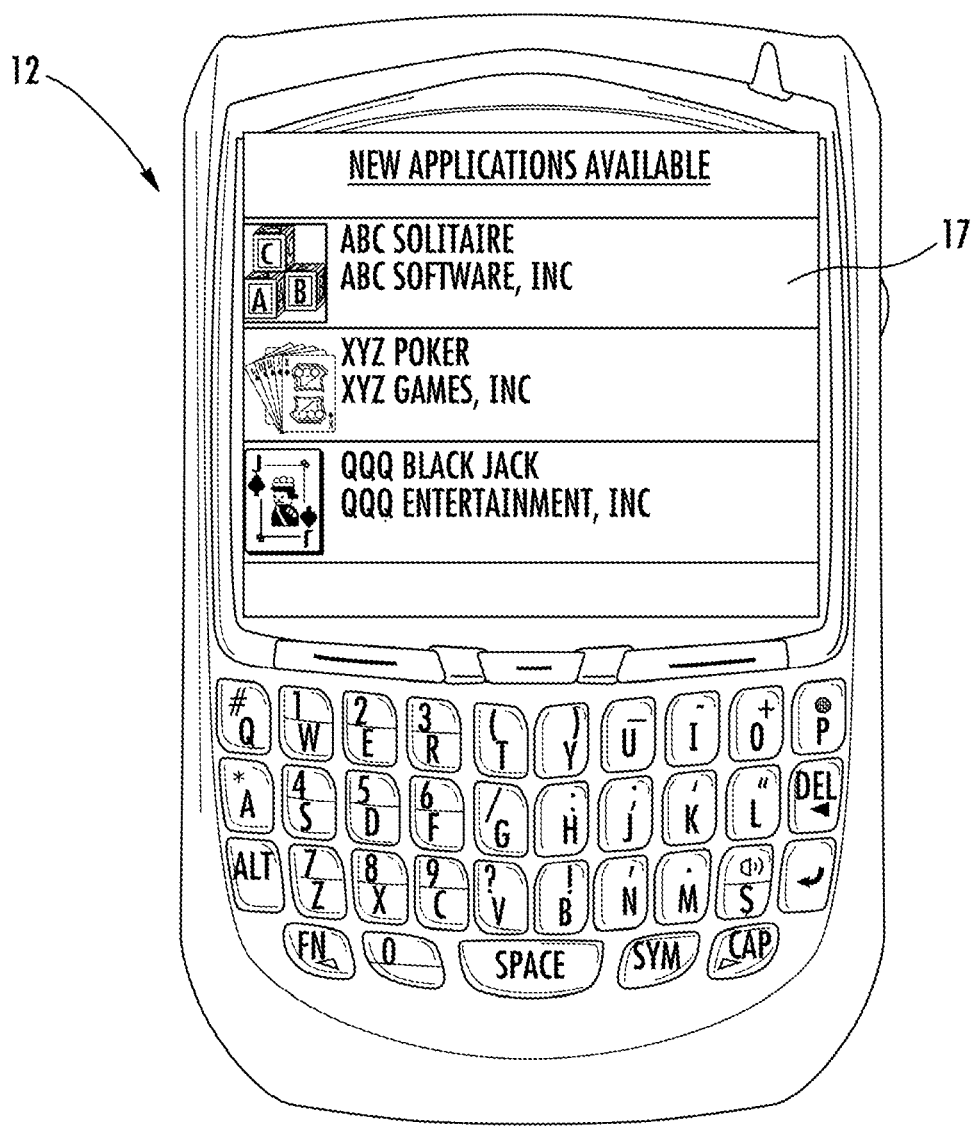
FIG. 5 is a front view of the mobile wireless communications device of FIG. 1 displaying a notification of availability of new applications based upon the selection preferences.

Shown in FIG. 5 is the notification received by the mobile wireless communications device 12 and displayed on the display 17 thereof. Here, the mobile wireless communications device 12 has received and is displaying notification of the availability of ABC Solitaire, XYZ Poker, and QQQ Black Jack. The user may now select at least one of the applications to download and install. The download may be directly from the application server 18 or may instead be from the intermediate server 22. In some applications, the application server 18 or the intermediate server 22 may send the new applications to the mobile wireless communications device 12 without a request therefrom, for example via a server push.

Figure 7:
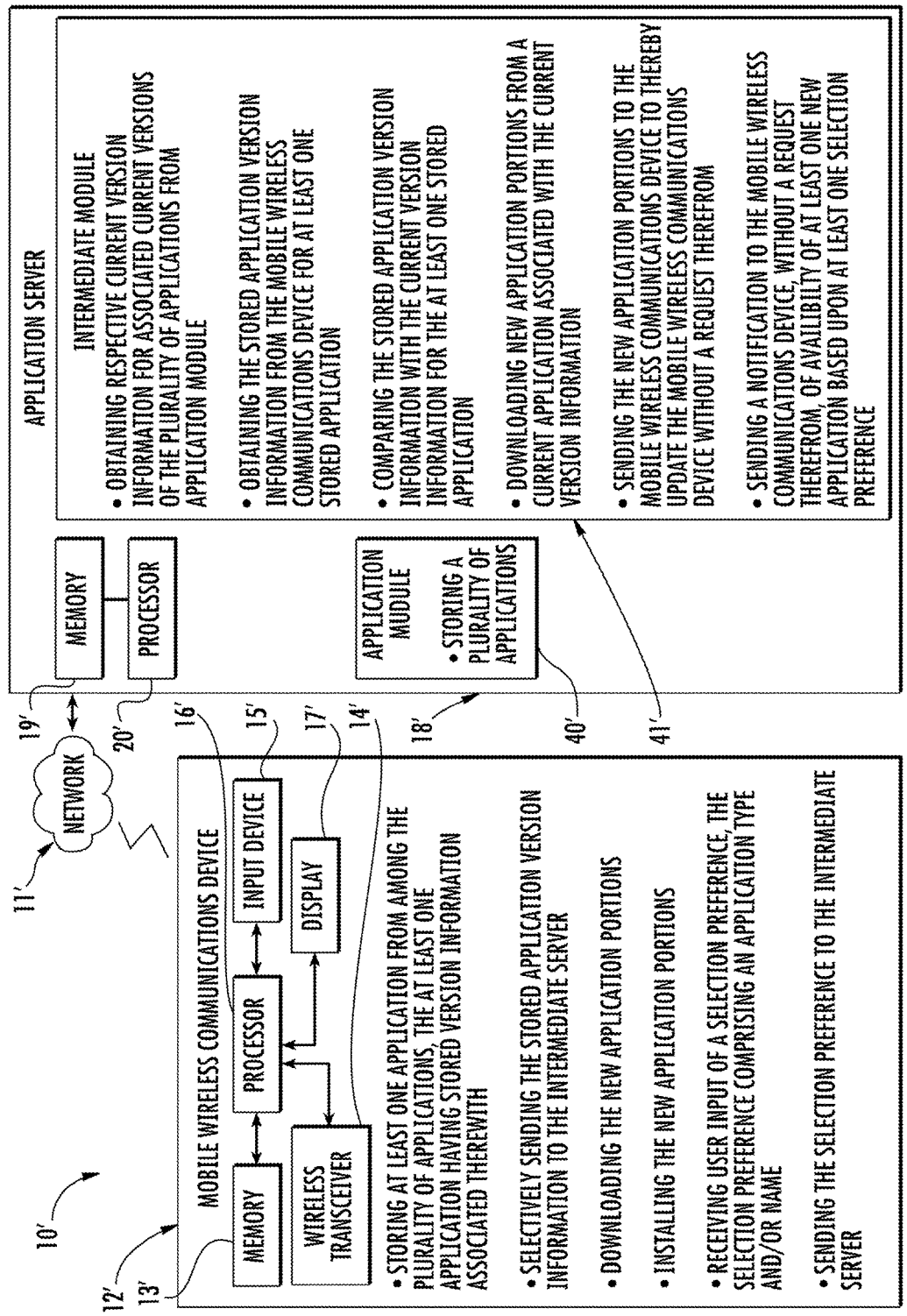
FIG. 7 is a schematic block diagram of an alternative embodiment communications system in accordance with the present disclosure.

Those skilled in the art will understand that the application server 18 and the intermediate server 22 need not be separate entities. Indeed, such an alternative embodiment of the communications system 10' is now described with reference to FIG. 7. In this embodiment, the application server 18' comprises an application module 40' to store the plurality of applications and an intermediate module 41'. The application module 40' and the intermediate module 41' perform the same functions as the application server 18 and intermediate server 22, respectively, as described above. As such, no further description of the application module 40' and intermediate module 41' is required, although it should be noted that the application module and intermediate module may comprise computer executable instructions that are stored in the memory 19' of the application server 18' and executed by the processor 20' of the application server.

Figure 6:
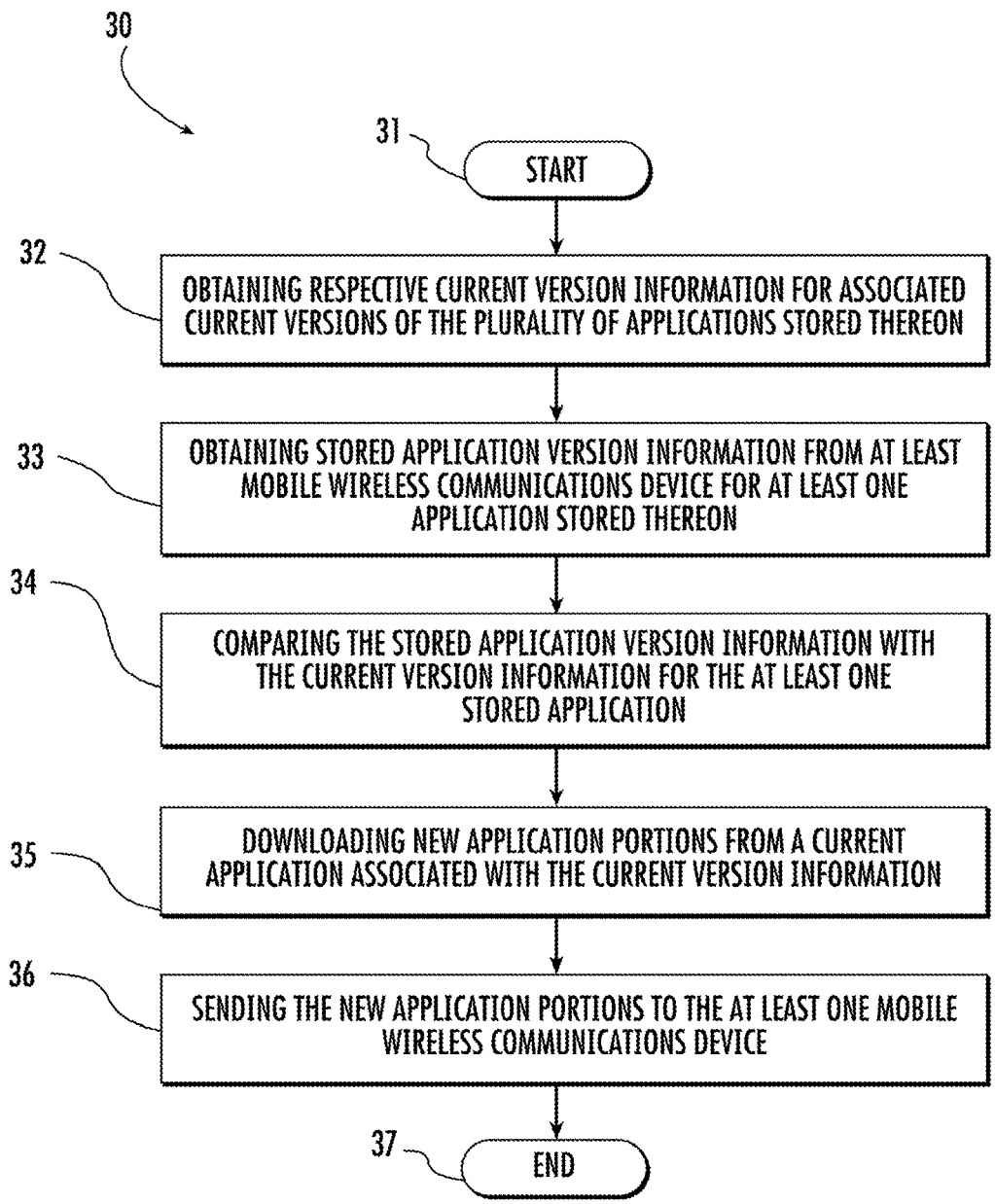
FIG. 6 is a flow chart illustrating a method of operating the communications system of FIG. 1.

A method of operating an intermediate server in accordance with the present disclosure is now described with reference to flowchart 30 of FIG. 6. After the start (Block 31), at Block 32, respective current version information is obtained from an application server for associated current versions of a plurality of applications stored thereon. At Block 33, stored application version information is obtained from at least one mobile wireless communications device for at least one application stored thereon.

At Block 34, the stored application version information is compared with the current version information for the at least one stored application. At Block 35, new application portions are downloaded from a current application associated with the current version information. At Block 36, the new application portions are sent to the at least one mobile wireless communications device. Block 37 indicates the end of the method.

Exemplary components of a hand-held mobile wireless communications device 1000 that may be used in accordance with the present disclosure are further described in the example below with reference to FIG. 8. The device 1000 illustratively includes a housing 1200, a keypad 1400 and an output device 1600. The output device shown is a display 1600, which may comprise a full graphic LCD. In some embodiments, display 1600 may comprise a touch-sensitive input and output device. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user. In some embodiments, keypad 1400 may comprise a physical keypad or a virtual keypad (e.g., using a touch-sensitive interface) or both.

The housing 1200 may be elongated vertically, or may take on other sizes and shapes (including clamshell housing structures). The keypad 1400 may include a mode selection key, or other hardware or software for switching between text entry and telephony entry.

Figure 8:
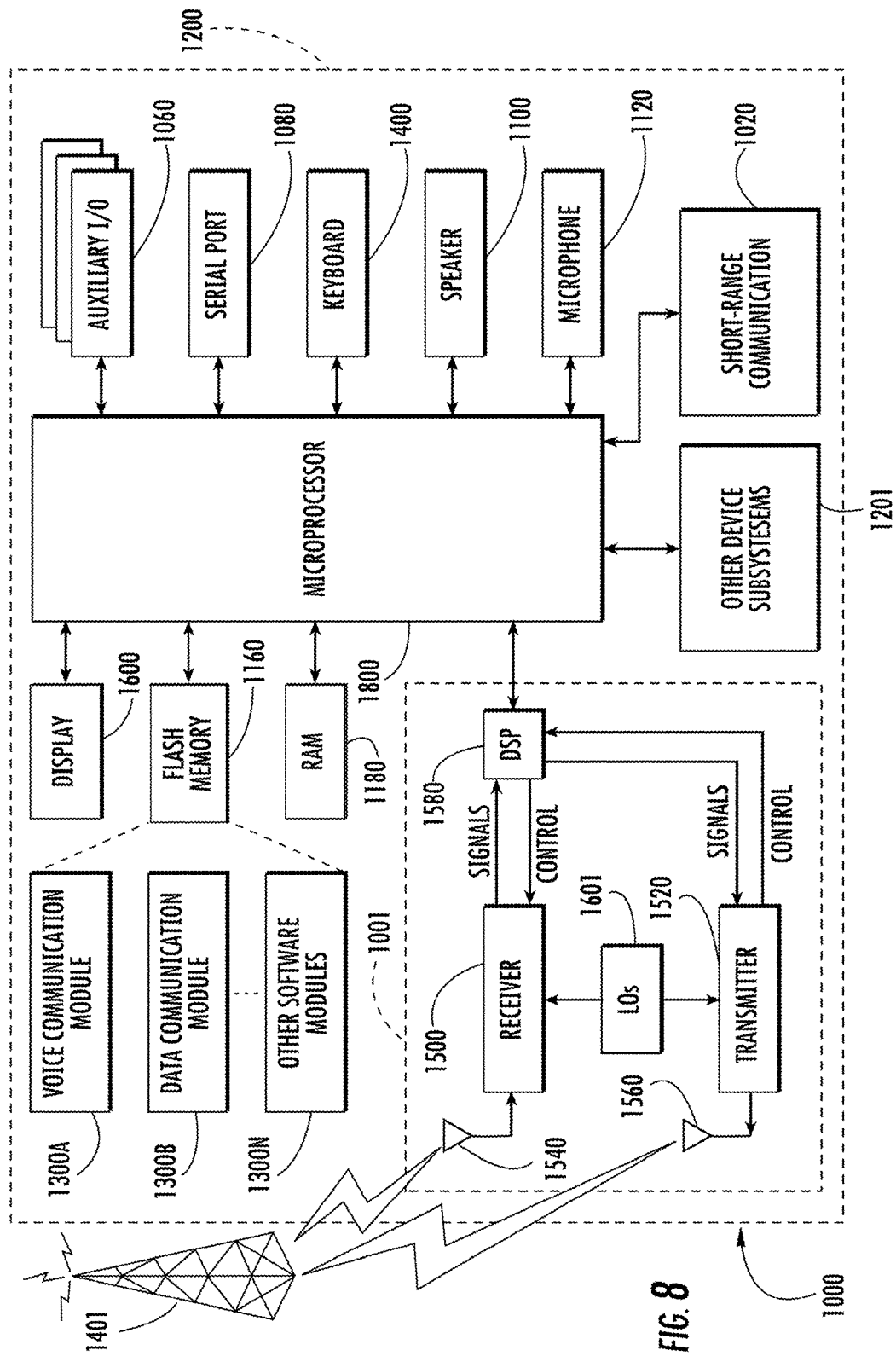
FIG. 8 is a schematic block diagram illustrating exemplary components of a mobile wireless communications device that may be used with the communications system disclosed in FIG. 1.

In addition to the processing device 1800, other parts of the mobile device 1000 are shown schematically in FIG. 8. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having voice and data communications capabilities. In addition, the mobile device 1000 may have the capability to communicate with other computer systems via the Internet.

Operating system software executed by the processing device 1800 may be stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3G, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore utilizes a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, track ball, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device for communications with a communications system, the communications system including at least one application server storing a plurality of applications, the mobile wireless communications device comprising:
   a memory configured to store more than one application from among the plurality of applications, the more than one application having stored version information associated therewith;
   a wireless transceiver; and
   a processor cooperating with said memory and said wireless transceiver and configured to:
      determine whether an intermediate server is permitted to obtain the stored version information, wherein the intermediate server is permitted to obtain the stored version information for at least one application of the more than one application stored in the memory and is not permitted to obtain the stored version information for at least one other application of the more than one application;
      if permitted, send the stored version information to the intermediate server based upon a request therefrom, and
      receive new application portions of a current version of the more than one application from the intermediate server based upon the stored version information.

2. The mobile wireless communications device of claim 1, wherein the at least one application stored in the memory comprises multiple application portions, and the processor is further configured to, after receiving the new application portions:
   delete at least one of the multiple application portions, and store the new application portions.

3. The mobile wireless communications device of claim 2, wherein the at least one application stored in the memory thereafter comprises the new application portions and at least one application portion of the stored multiple application portions.

4. The mobile wireless communications device of claim 1, wherein the processor is further configured to receive a selection of at least one application category, and to obtain notifications of application updates for applications in the selected at least one application category, the selected at least one application category including the at least one application.

5. The mobile wireless communications device of claim 1, wherein determining whether an intermediate server is permitted to obtain the stored version information comprises receiving a user selection to receive an update of the at least one application having the stored version information.

6. A method comprising:
   storing, in memory of a mobile wireless communications device, more than one application from among a plurality of applications, the more than one application having stored version information associated therewith, the plurality of applications being stored by at least one application server in a communications system;
   determining, by the mobile wireless communications device, whether an intermediate server is permitted to obtain the stored version information, wherein the intermediate server is permitted to obtain the stored version information for at least one application of the more than one application stored in the memory and is not permitted to obtain the stored version information for at least one other application of the more than one application;
   when the intermediate server is permitted to obtain the stored version information, sending, by the mobile wireless communications device, the stored version information to the intermediate server based upon a request therefrom; and
   receiving, by the mobile wireless communications device, new application portions of a current version of the at least one application from the intermediate server based upon the stored version information.

7. The method of claim 6, wherein the at least one application stored in the memory comprises multiple application portions, and the method further comprises, after receiving the new application portions, deleting, by the mobile wireless communications device, at least one of the multiple application portions, and storing the new application portions.

8. The method of claim 7, wherein the at least one application stored in the memory thereafter comprises the new application portions and at least one application portion of the stored multiple application portions.

9. The method of claim 6, wherein the method further comprises:
   receiving, by the mobile wireless communications device, a selection of at least one application category; and
   obtaining, by the mobile wireless communications device, notifications of application updates for applications in the selected at least one application category, the selected at least one application category including the at least one application.

10. The method of claim 6, wherein determining whether an intermediate server is permitted to obtain the stored version information comprises receiving a user selection to receive an update of the at least one application having the stored version information.

11. Non-transitory computer-readable media bearing code, which when executed by at least one processor of a mobile wireless communications device, causes the mobile wireless communications device to implement the method of:

storing, in memory, more than one application from among a plurality of applications, the more than one application having stored version information associated therewith, the plurality of applications being stored by at least one application server in a communications system;

determining whether an intermediate server is permitted to obtain the stored version information, wherein the intermediate server is permitted to obtain the stored version information for at least one application of the more than one application stored in the memory and is not permitted to obtain the stored version information for at least one other application of the more than one application;

when the intermediate server is permitted to obtain the stored version information, sending the stored version information to the intermediate server based upon a request therefrom; and receiving new application portions of a current version of the more than one application from the intermediate server based upon the stored version information.

12. The non-transitory computer-readable media of claim 11, wherein the at least one application stored in the memory comprises multiple application portions, and the method further comprises, after receiving the new application portions, the mobile wireless communications device deleting at least one of the multiple application portions, and storing the new application portions.

13. The non-transitory computer-readable media of claim 12, wherein the at least one application stored in the memory thereafter comprises the new application portions and at least one application portion of the stored multiple application portions.

14. The non-transitory computer-readable media of claim 11, wherein the method further comprises:

receiving, from a user, a selection of at least one application category; and obtaining notifications of application updates for applications in the selected at least one application category, the selected at least one application category including the at least one application.

15. The non-transitory computer-readable media of claim 11, wherein determining whether an intermediate server is permitted to obtain the stored version information comprises receiving a user selection to receive an update of the at least one application having the stored version information.

* * * * *